(12) United States Patent
James

(10) Patent No.: US 11,668,879 B2
(45) Date of Patent: Jun. 6, 2023

(54) FIBER OPTIC CABLE MANAGEMENT ENCLOSURE WITH MOUNTING ARRANGEMENT

(71) Applicant: HellermannTyton Data Limited—UK, Northampton (GB)

(72) Inventor: Jason James, Northampton (GB)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/523,241

(22) Filed: Nov. 10, 2021

(65) Prior Publication Data

US 2022/0342158 A1 Oct. 27, 2022

(30) Foreign Application Priority Data

Nov. 10, 2020 (GB) .................................... 2017700

(51) Int. Cl.
    *G02B 6/36* (2006.01)
    *G02B 6/44* (2006.01)
(52) U.S. Cl.
    CPC ......... *G02B 6/3616* (2013.01); *G02B 6/4471* (2013.01)
(58) Field of Classification Search
    CPC ........................... G02B 6/3616; G02B 6/4471
    See application file for complete search history.

(56) References Cited

U.S. PATENT DOCUMENTS

| 9,685,776 B2 * | 6/2017 | Coenegracht .......... F16J 15/104 |
| 10,230,223 B2 * | 3/2019 | Kemp ...................... H02G 3/10 |
| 2007/0230891 A1 | 10/2007 | Barth et al. |
| 2008/0224419 A1 * | 9/2008 | Mullaney ............... H02G 15/04 277/602 |
| 2014/0196380 A1 | 7/2014 | Burke |

FOREIGN PATENT DOCUMENTS

WO       2006127457 A1    11/2006

* cited by examiner

*Primary Examiner* — Sung H Pak
(74) *Attorney, Agent, or Firm* — Billion & Armitage

(57) ABSTRACT

A fiber enclosure with an integrated enclosure mounting system includes a base, a cover, and a clamp for securing the cover to the base. The base has an end wall with through openings extending therethrough and has a fiber management mounting frame provided on an inner side of the end wall. The mounting frame is configured to receive fiber management trays and the cover is engageable over the mounting frame and into abutment with the base and is securable to the base by the clamp to fully enclose the mounting frame and fiber management trays within a cavity formed between the cover and the base. The base also includes enclosure mounting sockets formed on an outer side surface thereof. The enclosure mounting sockets are releasably engageable with complementary shaped mounting post provided on a mounting arm to releasably secure the base to the mounting arm.

18 Claims, 6 Drawing Sheets

FIBER OPTIC CABLE MANAGEMENT ENCLOSURE WITH MOUNTING ARRANGEMENT

CROSS-REFERENCE TO RELATED APPLICATION

This application claims benefit of priority to Great Britain Patent Application No. 2017700.2 filed on Nov. 10, 2020, the entire disclosure of which is hereby incorporated by reference.

TECHNICAL FIELD OF THE INVENTION

The present invention relates to improvements in relation to fiber optic cable management enclosures and more particularly to mounting arrangements for such enclosures.

BACKGROUND

Fiber optic cable management enclosures are used to house, organise, manage, and protect fiber optic cables and terminations. IP rated enclosures are a particular type of enclosure which includes weather and/or waterproof seals to protect the fiber optic cables and fiber optic cable management equipment which is housed within the enclosure from exposure to water, moisture and other weather-related ingress which could cause damage and compromise the efficiency of data transfer along the fiber optic cables. Such IP rated enclosures are, then, typically located on street poles or in underground boxes and manage fiber optic cable routing in streets and the like.

A typical IP rated enclosure is formed of three parts—a base, a cover and a clamp, the cover being securable to the base by means of the clamp to form a cylindrical enclosure having a hollow interior. The base has through-openings in it through which fiber optic cable bundles can be routed for cables to enter and exit the hollow interior, with a suitable sealing arrangement being associated with each through-opening which seals around the bundle passing therethrough to prevent the ingress of liquid. A support frame is mounted on a face of the base which faces into the hollow interior when the base is mated with the cover, fiber optic cable management trays being mountable on the support frame to perform the required fiber optic cable management functions such as splitting, splicing and storage of fiber optic cables. A seal such as an O-ring seal locates between the base and the cover to ensure a fluid tight seal there between, and the clamp engages between the base and the cover to secure the two together. In one known configuration, each of the base and cover has an annular lip protruding from its outside surface proximate the mating surfaces which abut each other when the two parts are assembled, an annular clamp being positioned to extend across and around both ribs to hold them together and tighten in place by a latch. Other known configurations include a pair of pivot clamps being provided on the cover, diametrically opposite each other, each engaging a lip provided on the base to pull and retain the two parts together.

As a result of the network infrastructure market having been opened, it is often now the case that multiple suppliers will have equipment installed in the same underground chamber, each supplier's own technicians accessing their equipment in the chamber to perform maintenance and the like thereto. It is therefore necessary to have a mounting system in place which securely mounts the enclosures to prevent damage occurring to fiber optic cable bundles whilst enabling access to each of the enclosures without risk of damage to other enclosures mounted in the same chamber.

One known mounting system utilizes mounting arms which secures to the clamp bands of each enclosure to secure the enclosures in the chamber. An individual enclosure can then be removed from the chamber by simply releasing the clamping band, thereby enabling the cover to be removed and the base to be moved away from the chamber to be worked on clear of the other enclosures in the chamber. However, this arrangement has the drawback that the only way to work on an enclosure is to completely release it from the chamber by releasing the clamping band, because of which the enclosure is unsupported while it is being worked upon, thereby increasing the risk of damage to fiber optic cable bundles which are routed through the enclosure.

SUMMARY

According to the present invention, a fiber optic cable enclosure is provided with an integrated enclosure mounting system, comprising an enclosure base, an enclosure cover and clamping means for securing the cover to the base, the base having an end wall with at least one through opening extending therethrough and having fiber optic cable management mounting means provided on one side of the end wall, which, in use, forms an inner surface of the enclosure, the fiber optic cable management mounting means being configured to receive fiber management means, the cover being engageable over the fiber optic cable management mounting means and into abutment with the base and being securable to the base by the clamping means to fully enclose the fiber optic cable management mounting means and fiber optic cable management means mounted thereon with a cavity formed between the cover and the base; wherein the enclosure base further includes enclosure mounting means formed on an outer side surface thereof, the enclosure mounting means being releasably connectable to complementary mounting means provided on a mounting arm to releasably secure the enclosure base to the mounting arm.

A fiber optic cable enclosure in accordance with the invention has the advantage that the enclosure is secured in its use position, such as to a chamber, wall or to a mounting pole, by means of the base, as a result of which the cover can be removed by releasing the clamping to expose the fiber optic cable management means mounted on the base for working access whilst the base is kept secured to the chamber, wall or pole, thereby keeping the base and fiber optic cable management means fully supported whilst it is worked upon. Furthermore, by making the connection between the base and the mounting arm releasable, the base can easily be detached from the arm and completely removed from the chamber, wall or pole if required.

Preferably, the base includes multiple enclosure mounting means distributed about its outer periphery to enable the base to be secured to the arm in different rotational positions. In a particularly preferred embodiment, three enclosure mounting means are provided spaced at 90-degree internals around the base.

Each enclosure mounting means is preferably integrally formed with the base such as co-molded therewith, by means of which a particularly secure construction is achieved.

The clamping means may be formed as a separate part to the base and the cover, such as a clamping ring which secures around abutting lips formed on the base and the cover to hold them together or may be mounted on the outside the base and/or the cover and engage the other of the base and the cover to secure the two together.

Each enclosure mounting means preferably comprises one of a post and a socket provided on the outer side wall of the base, the arm being provided with the other of the post and the socket on an engaging end, complementary shaped to engage with the post or the socket provided on the base. A locking member such as a locking pin is then insertable through the engaged post and socket to retain them together and lock the base to the arm. Preferably, the pin is configured such that the base is pulled tightly to the arm as the pin is inserted through the engaged post and socket. For example, the pin or the post and socket may have a tapered surface such that a camming action is developed between the pin and the post/socket as the pin is inserted.

A single locking member may be provided to secure the peg and socket together or multiple such members by be utilised by providing multiple engagement holes in the peg and socket which align with each other to receive a locking pin. Each locking pin may be threaded or may have a simple friction engagement with the post and socket.

The arm may provide a fixed attachment for the enclosure or may be pivotable to enable the enclosure, when attached to the arm, to be pivoted with the arm into an access position before the cover is removed.

According to a further aspect of the invention there is provided a fiber optic cable enclosure with integrated enclosure mounting system according to the first aspect of the invention including a mounting arm secured at one end to side of the base by the enclosure mounting means provided on the base, the one end of the mounting arm has mounting means formed thereon which complement the mounting means provided on the base.

BRIEF DESCRIPTION OF THE DRAWINGS

The present invention will now be described, by way of example with reference to the accompanying drawings, in which.

DETAILED DESCRIPTION

Figure 1:
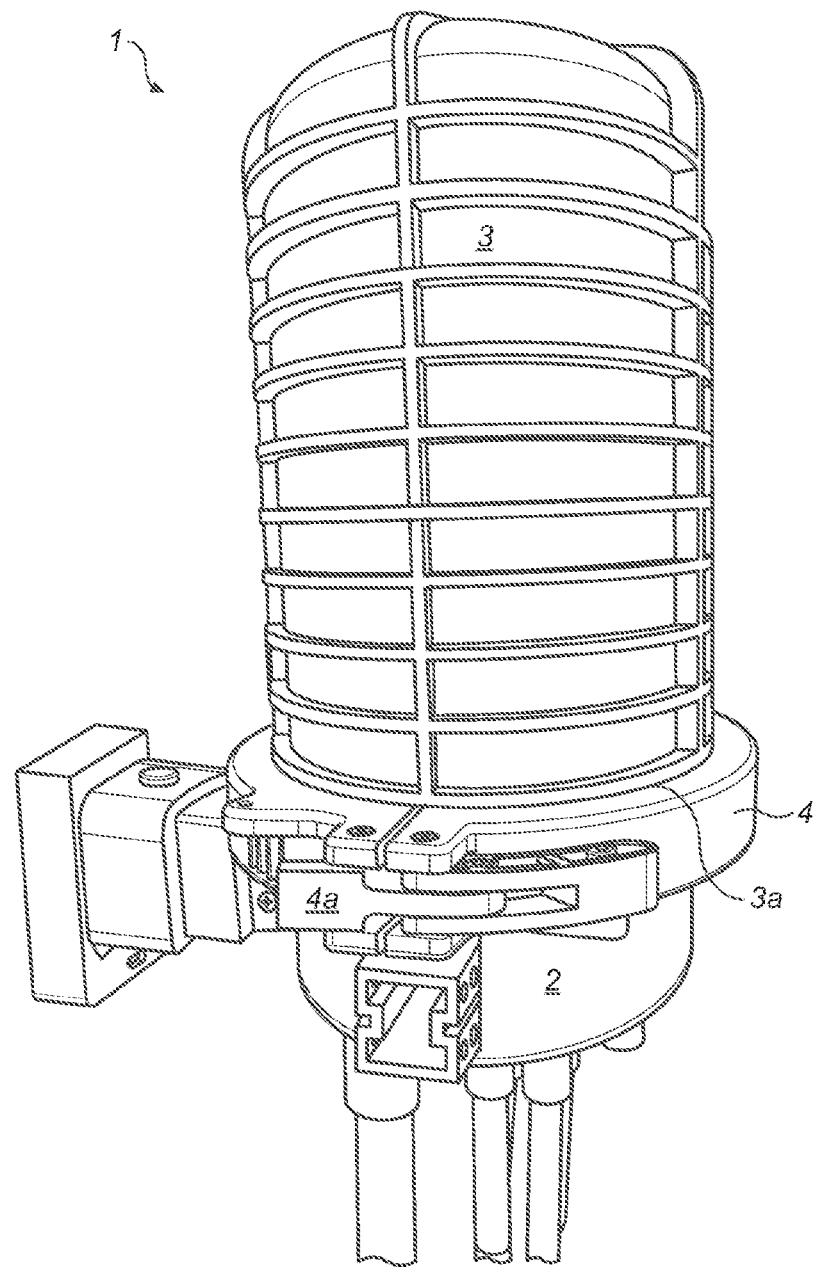
FIG. 1 is a perspective view of an assembled fiber optic cable enclosure assembly according to the invention.

An example of a fiber optic cable management enclosure 1 is shown in FIG. 1. The enclosure 1 is generally cylindrical, although it will be understood that other shapes are possible without departing from the invention. The enclosure 1 is formed by a base 2 and a cover 3 which are engaged together to form the cylindrical enclosure with a hollow interior in which is housed fiber optic cable management trays 13 (see FIG. 2) of the type which are well known in the art. A clamp 4 extends around abutting ends 2a, 3a of the base and cover and locks them together as described below, and the whole assembly is mounted on mounting arm 5.

Figure 2:
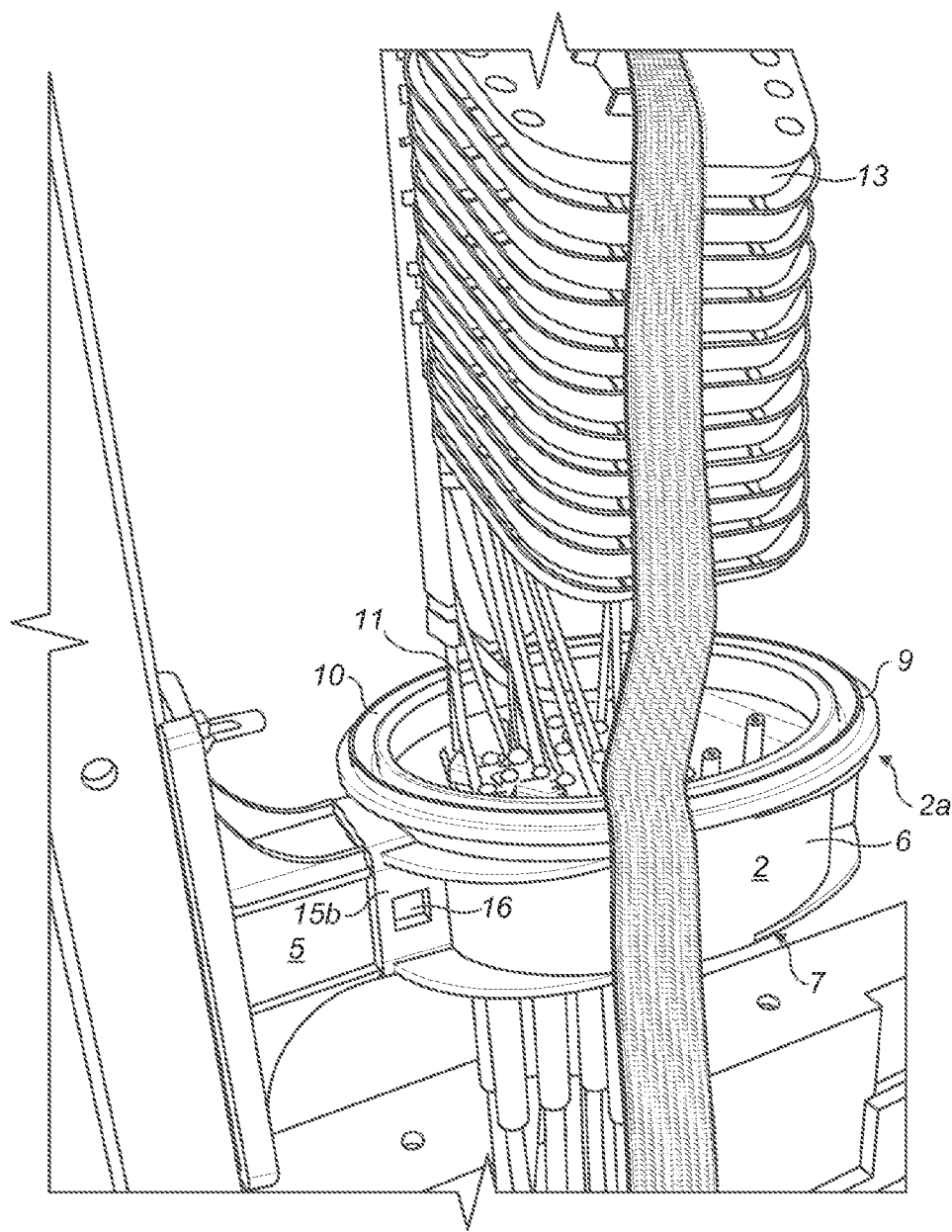
FIG. 2 is a perspective view of a base portion of the assembly of FIG. 1 with cover portion removed.

As shown in FIG. 2, the base 2 is of hollow cylindrical form with a circular cross section formed by a side wall 6 which upstands from a circular end face 7. The end face 7 has several through openings in it to allow fiber optic cables and bundles 8 to be routed into and out of the interior of the enclosure in a well-known manner. Suitable sealing means of the type well known in the art are used to seal around the cables and bundles passing through the end face 7 to prevent the ingress of moisture into the interior of the enclosure through the openings. The end 2a of the side wall 6 remote from the end face 7 has a circumferential flange 9 extending around it to facilitate securing the base to the cover as set out below and has a circular groove 10 in its annular end face which is size to receive an annular rib formed on the abutting end face of the cover 3 form locating the two together in a well-known manner A seal such as an O-ring seal is located within the groove to provide a watertight seal between the cover and base when they are engaged together.

The base 2 also has a mounting frame 11 secured to and extending from the inside of its end face 7 to as to be enclosed within the cover 3 when the cover 3 is fitted to the base. The fiber optic cable management trays 13 are mounted on the mounting frame 11 in a manner known in the art.

Figure 3:
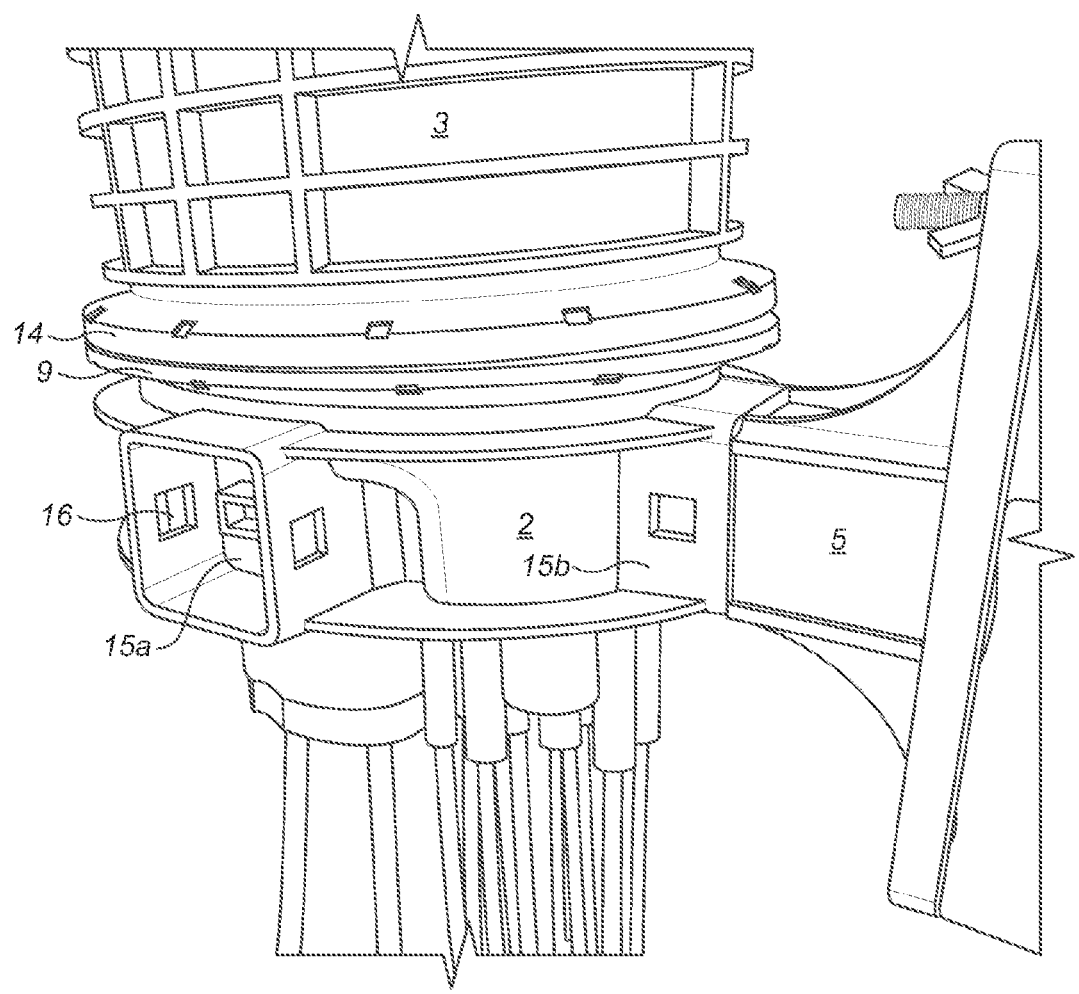
FIG. 3 is a detail perspective view of the assembly of FIG. 1 showing a mounting recess of the base.

As shown in FIG. 3, the end 3a of the cover 3 which engages with the end 2a of the base 2 also has a circumferential flange 14 extending around it of complementary size to the flange 9 formed on the base 2. When the cover 3 is engaged with the base 2 as shown in FIG. 3, the two circumferential flanges 9, 14 are located next to each other, and the clamp 4, which takes the form of a split ring with an internal circumferential channel who size complements the size of the abutting the circumferential flanges 9, 14, can be fitted around and over the two circumferential flanges 9, 14 and locked in a closed position there-around by means of latch 4a, thereby securing the cover 3 and the base 2 together. It will, though, be understood that other clamping systems can be used without departing from the scope of the invention, such as latches provided on the outside of the cover and/or base which latch to a corresponding latch part provided on the other of the cover/base to hold them together.

As shown in FIG. 3, the base 2 also has mounting sockets 15a, 15b formed on the outside of its circular side wall. Two such sockets 15a, 15b are visible in FIG. 3, and are distributed around the base at 90-degree internals, with a third such sockets also being provided diametrically opposite the mounting socket 15a, which is not visible in FIG. 3. Accordingly, in the illustrated embodiment, a total of three sockets are provided at 90-degree spacings, but other spacings could also be used, such as at 120 degrees to each other, and/or more or fewer sockets could be present.

Figure 4:
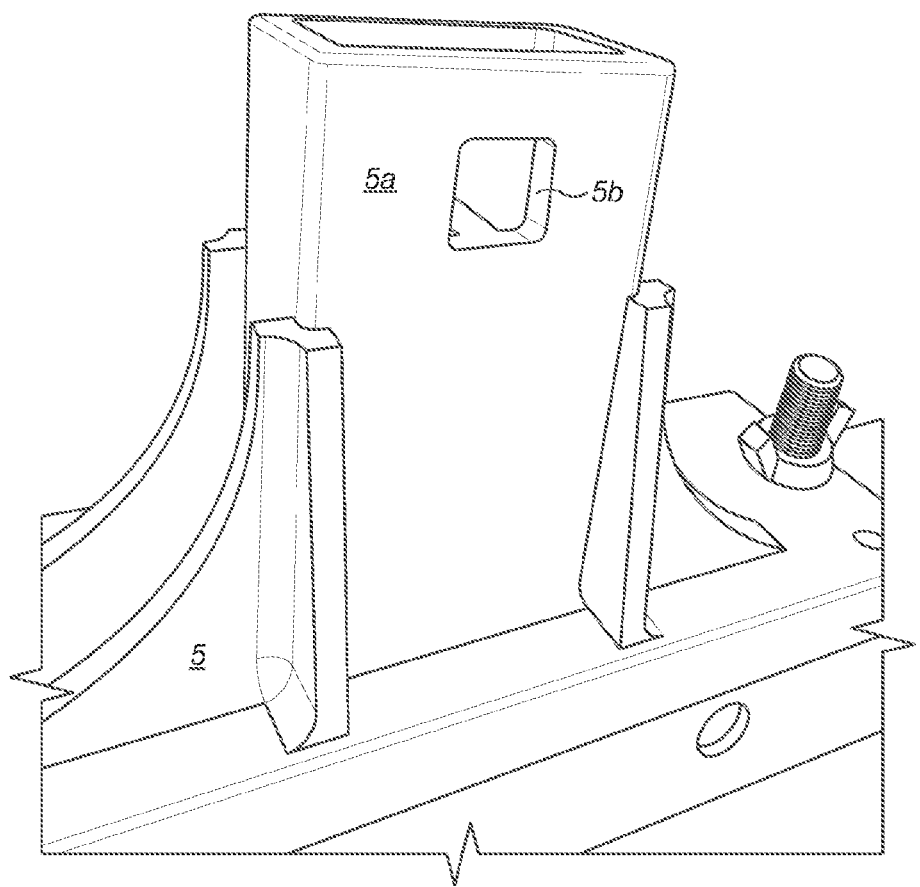
FIG. 4 is a perspective view of a mounting arm for the assembly of FIG. 1.
Figure 5:
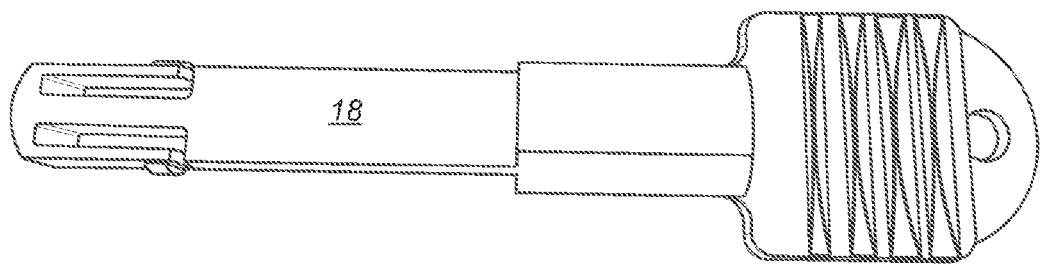
FIG. 5 is a side view of a locking pin which secures the base to the mounting arm.
Figure 6:
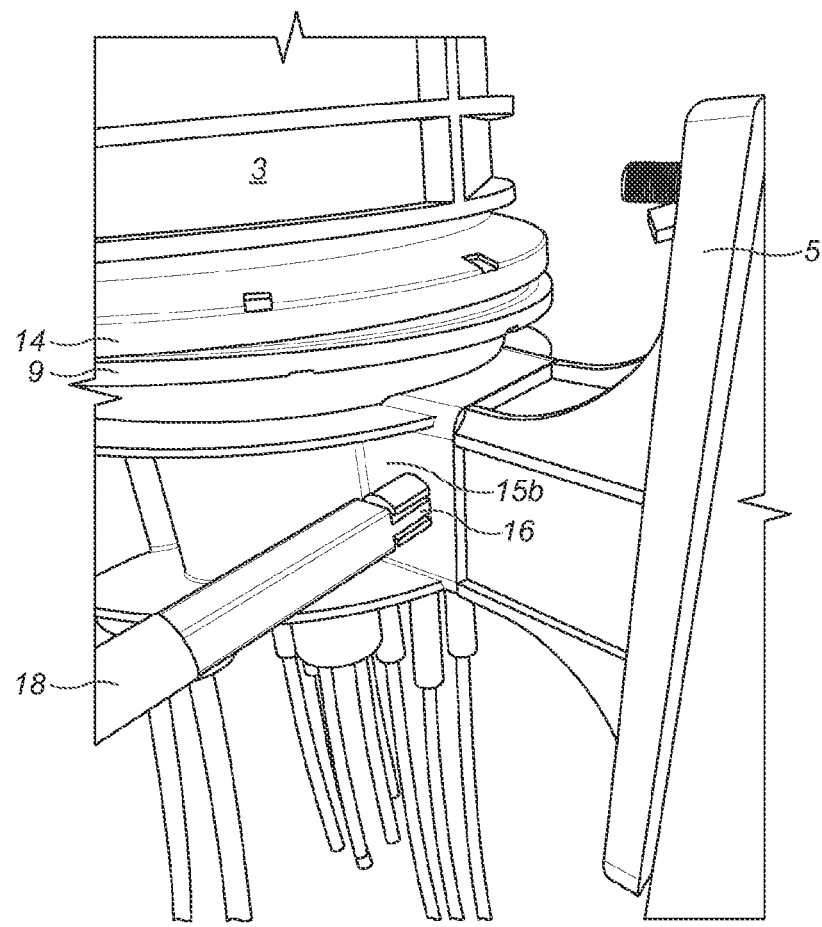
FIG. 6 is an enlarged view showing the engagement of the locking pin with the mounting assembly of the arm and base.
Figure 7:
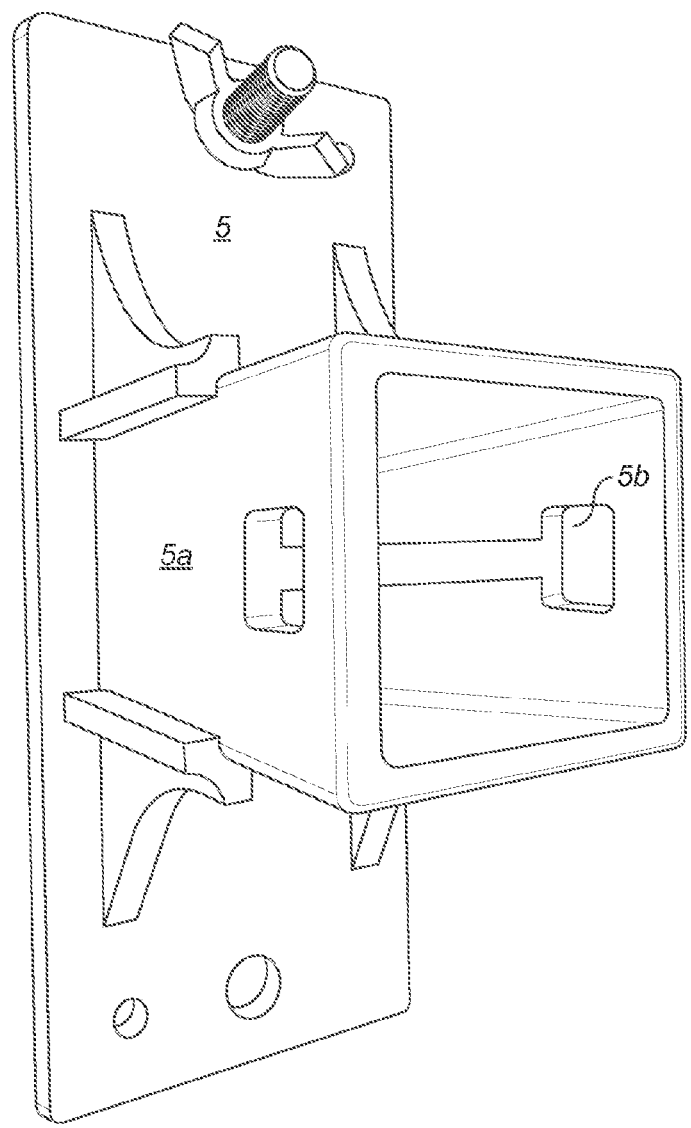
FIG. 7 is an end view of the mounting arm of FIG. 4 showing the configuration of the end which engages with the enclosure base.

Each mounting socket 15a, 15b has a rectangular internal profile as can be seen in FIG. 3, which is sized and shaped to complement the external profile of a mating mounting post 5a formed in the arm 5 as shown in FIG. 4, so that the post 5a is a close tolerance fit in each mounting socket 15a, 15b. Each of the post 5a and the mounting sockets 15a, 15b also have aligned holes 5b, 16 in their side walls, through which a locking pin 18 shown in FIG. 5 can be inserted to extend completely through each part. The holes 5b, 16 (see FIGS. 6 and 7), are positioned in each part such that when the post 5a is properly engaged in one of the mounting sockets 15a, 15b, all the holes 6b, 16 aligned with each other and the locking pin 18 can be engaged through the aligned holes in both parts (see FIG. 6), locking them together against withdrawal of the post 5a from the mounting socket 15a, 15b.

The invention claimed is:

1. A fiber optic cable enclosure with an integrated enclosure mounting system, comprising:
an enclosure base;
an enclosure cover; and
clamping means for securing the cover to the base, the base having an end wall with at least one through opening extending therethrough and having a fiber optic cable management mounting means provided on one side of the end wall, which, in use, forms an inner surface of the enclosure, the fiber optic cable management mounting means being configured to receive a fiber optic cable management means, the cover being engageable over the fiber optic cable management mounting means and into abutment with the base and being securable to the base by the clamping means to fully enclose the fiber optic cable management mounting means and fiber optic cable management means mounted thereon within a cavity formed between the cover and the base; wherein the enclosure base further includes enclosure mounting means formed on an outer side surface thereof, the enclosure mounting means being releasably connectable to complementary mounting means provided on a mounting arm to releasably secure the enclosure base to the mounting arm, wherein each enclosure mounting means comprises a post provided on the outer side wall of the base, the arm being provided with a socket on an engaging end, complementary shaped to engage with the post provided on the base.

2. The fiber optic cable enclosure according to claim 1, wherein the base includes multiple enclosure mounting means distributed about its outer periphery to enable the base to be secured to the arm in different rotational positions.

3. The fiber optic cable enclosure according to claim 1, three enclosure mounting means are provided spaced at 90-degree internals around the base.

4. The fiber optic cable enclosure according to claim 1, each enclosure mounting means is integrally formed with the base.

5. The fiber optic cable enclosure according to claim 1, the clamping means is formed as a separate part to the base and the cover.

6. The fiber optic cable enclosure according to claim 1, wherein a locking member is insertable through the engaged post and socket to retain them together and lock the base to the arm.

7. The fiber optic cable enclosure according to claim 6, wherein the post provided on the base has a lateral through opening, through which the locking member is insertable to lock the base to the arm.

8. The fiber optic cable enclosure according to claim 6, where the locking member is configured to pull the base tightly to the arm as the locking member is inserted through the engaged post and socket.

9. The fiber optic cable enclosure according to claim 8, wherein the post provided on the base and the locking member has a tapered surface such that a camming action is developed between the locking member and the post as the locking member is inserted.

10. A fiber optic cable enclosure with an integrated enclosure mounting system, comprising:
an enclosure base;
an enclosure cover; and
clamping means for securing the cover to the base, the base having an end wall with at least one through opening extending therethrough and having a fiber optic cable management mounting means provided on one side of the end wall, which, in use, forms an inner surface of the enclosure, the fiber optic cable management mounting means being configured to receive a fiber optic cable management means, the cover being engageable over the fiber optic cable management mounting means and into abutment with the base and being securable to the base by the clamping means to fully enclose the fiber optic cable management mounting means and fiber optic cable management means mounted thereon within a cavity formed between the cover and the base; wherein the enclosure base further includes enclosure mounting means formed on an outer side surface thereof, the enclosure mounting means being releasably connectable to complementary mounting means provided on a mounting arm to releasably secure the enclosure base to the mounting arm, wherein each enclosure mounting means comprises a socket provided on the outer side wall of the base, the arm being provided with a post on an engaging end, complementary shaped to engage with the socket provided on the base.

11. The fiber optic cable enclosure according to claim 10, wherein a locking member is insertable through the engaged post and socket to retain them together and lock the base to the arm.

12. The fiber optic cable enclosure according to claim 11, wherein the socket provided on the base has a lateral through opening, through which the locking member is insertable to lock the base to the arm.

13. The fiber optic cable enclosure according to claim 11, wherein the locking member is configured to pull the base tightly to the arm as the locking member is inserted through the engaged post and socket.

14. The fiber optic cable enclosure according to claim 13, wherein the socket provided on the base and the locking member has a tapered surface such that a camming action is developed between the locking member and the socket as the locking member is inserted.

15. The fiber optic cable enclosure according to claim 1, further including the mounting arm having mounting means provided on an end thereof which complements the mounting means of the base such that the end of the mounting arm is engageable with the mounting means of the base to fasten the base to the end of the arm.

16. A fiber optic cable enclosure with an integrated enclosure mounting system, comprising:
an enclosure base;
an enclosure cover; and
clamping means for securing the cover to the base, the base having an end wall with at least one through opening extending therethrough and having a fiber optic cable management mounting means provided on one side of the end wall, which, in use, forms an inner surface of the enclosure, the fiber optic cable management mounting means being configured to receive a fiber optic cable management means, the cover being engageable over the fiber optic cable management mounting means and into abutment with the base and being securable to the base by the clamping means to fully enclose the fiber optic cable management mounting means and fiber optic cable management means mounted thereon within a cavity formed between the cover and the base; wherein the enclosure base further includes enclosure mounting means formed on an outer side surface thereof, the enclosure mounting means being releasably connectable to complementary mounting means provided on a mounting arm to releasably secure the enclosure base to the mounting arm, wherein the mounting arm has mounting means provided on an end thereof which complements the mounting means of the base such that the end of the mounting arm is engageable with the mounting means of the base to fasten the base to the end of the arm and, wherein the mounting means on the base comprises one of a post and a socket provided on the outer side wall of the base, and the mounting means of the mounting arm comprises the other of a post and a socket.

17. The fiber optic cable enclosure according to claim 16, wherein the mounting means of each of the base and the arm has a lateral through opening extending therethrough, the through openings aligning when the mounting means of the base is fully engaged with the mounting means of the arm such that a locking pin is insertable through the mounting means of both the base and the arm to lock them together.

18. The fiber optic cable enclosure according to claim 15, wherein the arm includes a pivot coupler such that the end of the arm having the mounting means can be pivoted relative to the other end thereof.

\* \* \* \* \*